United States Patent [19]

Devany et al.

[11] Patent Number: 5,179,660
[45] Date of Patent: Jan. 12, 1993

[54] SYSTEM FOR REDUCING COMMUNICATIONS OVERHEAD IN DISTRIBUTED DATABASE TRANSACTIONS BY SERIALIZING IN ORDER RELATED REQUESTS INTO SINGLE TRANSMISSION MESSAGE AND RECEIVING TRANSMISSION RESPONSE

[75] Inventors: Estel P. Devany, Round Rock; Jane R. Garrison, Austin; Dwayne C. Jacobs, Austin; Lloyd E. Jordan, II, Austin, all of Tex.

[73] Assignee: International Business Machines Incorporated, Armonk, N.Y.

[21] Appl. No.: 352,082

[22] Filed: May 15, 1989

[51] Int. Cl.⁵ .................. G06F 13/14; G06F 15/40
[52] U.S. Cl. .................. 395/200; 364/222.2; 364/284.3; 364/284.4; 364/282.1; 364/974.6; 364/940.6; 364/940.61; 364/DIG. 1; 395/600
[58] Field of Search ... 364/200 MS File, 900 MS File; 395/200, 600

[56] References Cited

U.S. PATENT DOCUMENTS

| | | | |
|---|---|---|---|
| 4,641,274 | 2/1987 | Swank | 364/900 |
| 4,642,763 | 2/1987 | Cummins | 364/200 |
| 4,901,223 | 2/1990 | Rhyne | 364/200 |
| 4,939,644 | 7/1990 | Harrington et al. | 364/200 |
| 4,970,655 | 11/1990 | Winn et al. | 364/479 |

Primary Examiner—Thomas C. Lee
Assistant Examiner—Ken S. Kim
Attorney, Agent, or Firm—Paul W. O'Malley

[57] ABSTRACT

A system suitable for use on a computer network provides a user interface on a local node and an application to be run on a remote node. An application for accepting input from the user and translating it to appropriate commands for the remote application is divided, and located partially on the local node and partially on the remote node. That portion located on the local node gathers any information required from the user and transmits it to the portion located on the remote node in an efficient manner. The remote location portion uses the transmitted information to interface with the remote application and obtain results. The results are collected and transmitted to the local portion, from which they are returned to the user.

9 Claims, 3 Drawing Sheets

SYSTEM FOR REDUCING COMMUNICATIONS OVERHEAD IN DISTRIBUTED DATABASE TRANSACTIONS BY SERIALIZING IN ORDER RELATED REQUESTS INTO SINGLE TRANSMISSION MESSAGE AND RECEIVING TRANSMISSION RESPONSE

CROSS REFERENCE TO RELATED APPLICATION

The present application contains subject matter related to co-pending application Ser. No. 07/352,076, now abandoned, entitled REMOTE INTERRUPT PROCESSING, filed on even date herewith and assigned to the assignee hereof, and which is incorporated by reference herein.

BACKGROUND OF THE INVENTION

1. Technical Field

The present invention is related generally to digital computers, and more specifically to a system and method for executing application programs over a distributed network.

2. Background Art

As small computers continue to become more powerful, and their costs decrease, networks of computers continue to become more common. These networks can be connected using a variety of network architectures, and typically consist of a moderate to large number of nodes. Each node can be a stand alone computer system, or a network shared resource such as a file server or printer.

In some networks, it is common for a user at one node to wish to execute a program or access data which resides on another node. Such execution or access can be accomplished in several different ways. The user can copy the necessary files from the remote node to his own local node, and process them locally. It is also possible to have the local node, typically a workstation or desktop computer, emulate a simple terminal, and access the remote node. Under the second arrangement, commands are entered from, and results displayed on, the local node, while all processing takes place on the remote node.

A third technique is to execute an applications program on the local node which communicates to the remote node in a manner transparent to the user. The local applications program can send commands to the remote node in order to access data or cause execution of programs on the remote node.

The techniques just described have several obvious limitations and drawbacks. The technique of copying data and programs to a local node, not in general use on sophisticated networks, spends large amounts of time copying files which may be quite large in comparison to the amount of data actually needed. Also, creating multiple copies of files introduces a serious data coherency problem, in that it is difficult to reflect updates to a central location in a timely manner.

Using a local node to emulate a simple terminal minimizes the copying of large files from one node to another, but still uses a fairly large share of network communication resources. Everything typed at the local terminal, and everything displayed thereon, requires transmission of information over the network. Using an applications program running on the local node to interface with a user and send encoded commands to the remote node can decrease the amount of information transmitted, but does not entirely eliminate the problem.

For example, it is common for a central database to be connected to a network for access by the other nodes. The database can be accessed with special commands, such as those used in a Structured Query Language (SQL). Each SQL statement defines a single request to the database. As used herein, a transaction is an integral piece of work which, when completed, is committed to the database. All changes to the database are tentative until committed, so that an interrupted transaction can be rolled back, leaving the database in the same state it was before the transaction began. A series of database requests are generally needed to perform a single transaction.

When an application is running on a local node, and communicating with a database manager on a remote, or server, node, each request in a transaction requires two communications over the network. The database request must first be transmitted from the local node to the database server, and the results must be returned to the local node. Thus, if a single transaction requires 7 database requests, 14 separate messages must be communicated over the communications network.

It would be desirable for a system which runs application programs on remote nodes to minimize the network communications resources required for such processing.

SUMMARY OF THE INVENTION

It is therefore an object of the present invention to provide for applications processing at a location remote from a user.

It is another object of the present invention to provide for such remote processing in such a manner as to minimize the amount of information communicated over a network.

It is a further object of the present invention to provide such a system which requires only two messages to be communicated in order for multiple database access requests to be performed.

Therefore, in order to accomplish these and other objects, a system suitable for use on a computer network provides a user interface on a local node and an application to be run on a remote node. An application for accepting input from the user and translating it to appropriate commands for the remote application is divided, and located partially on the local node and partially on the remote node. That portion located on the local node gathers any information required from the user and transmits it to the portion located on the remote node in an efficient manner. The remote location portion uses the transmitted information to interface with the remote application and obtain results. The results are collected and transmitted to the local portion, from which they are returned to the user.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

The preferred embodiment is described in terms of a system and method for remotely accessing a database over a network. As will be described below, the precise nature of the database and software for directly manipulating that database do not form a part of the present invention. However, the preferred embodiment will be described as relates to a database manager which accepts requests using a Structured Query Language (SQL) such as is available from IBM.

Figure 1:
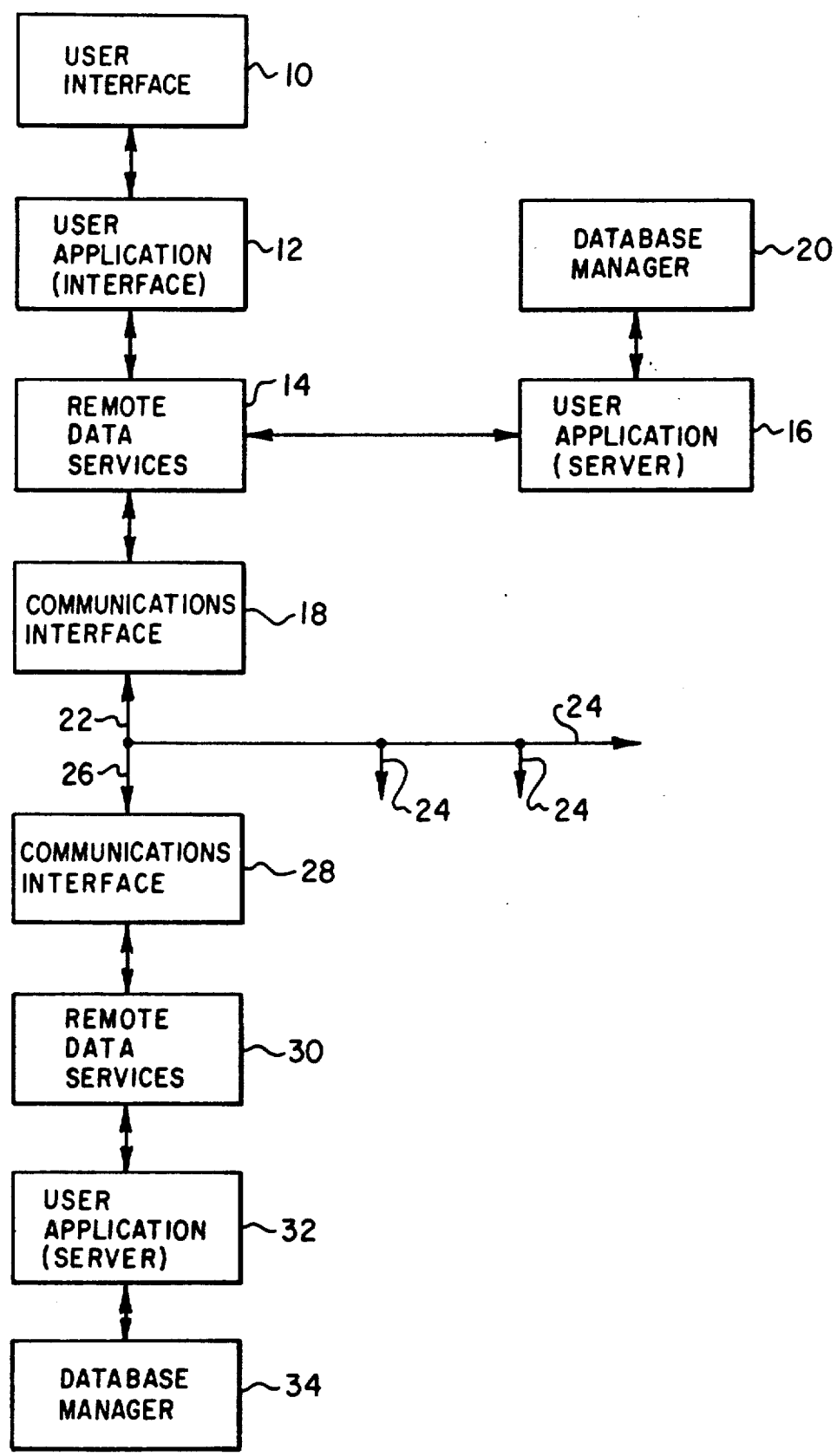
FIG. 1 is a block diagram of a system according to the present invention.

Referring to FIG. 1, a system for making remote database accesses includes a user interface 10. The interface, typically including a display, keyboard, mouse or other pointing device, and software to drive these devices, is in communication with a user application (interface portion) 12. The interface portion 12 includes software for accepting input from the user interface 10 and directing output thereto. Typically, a computer system on a network will have a single user interface 10, with multiple user applications 12 which can be invoked by the user.

A remote data services software utility 14 can be invoked by the interface portion 12, generally through a procedure call. The remote data services 14, in turn, can invoke, via a procedure call, either a user application (server portion) 16 or a communications interface utility 18. As is described below, the server portion 16 generates calls to a local database manager 20, and accepts results returned therefrom. The database manager 20 accepts requests from the server portion 16 in a predetermined format, such as SQL requests, and performs reads and updates on a database. The details of the database and the database manager 20 do not form a part of the present invention. SQL database managers are commonly available, and many of these can be used with the present invention with little or no modification.

The communications interface utility 18 connects to a network represented by communications line 22. A large number of other devices may be connected to the network as indicated by communication lines 24, and one node in particular is connected through communications line 26 which is attached to a communications interface 28. The type of network used does not form a part of the present invention, and the communications interfaces 18, 28 are simply those which are appropriate to a given network environment. Many different commonly available network protocols are suitable for use with the present invention.

At the remote node, a remote data services software utility 30 communicates with communications interface 28. The remote data services utility 30 also communicates with a user application (server portion) 32, which in turn makes database requests to a database manager 34. The communications between and operations of items 30, 32, and 34 is similar to that of items 14, 16, and 20.

Figure 2:
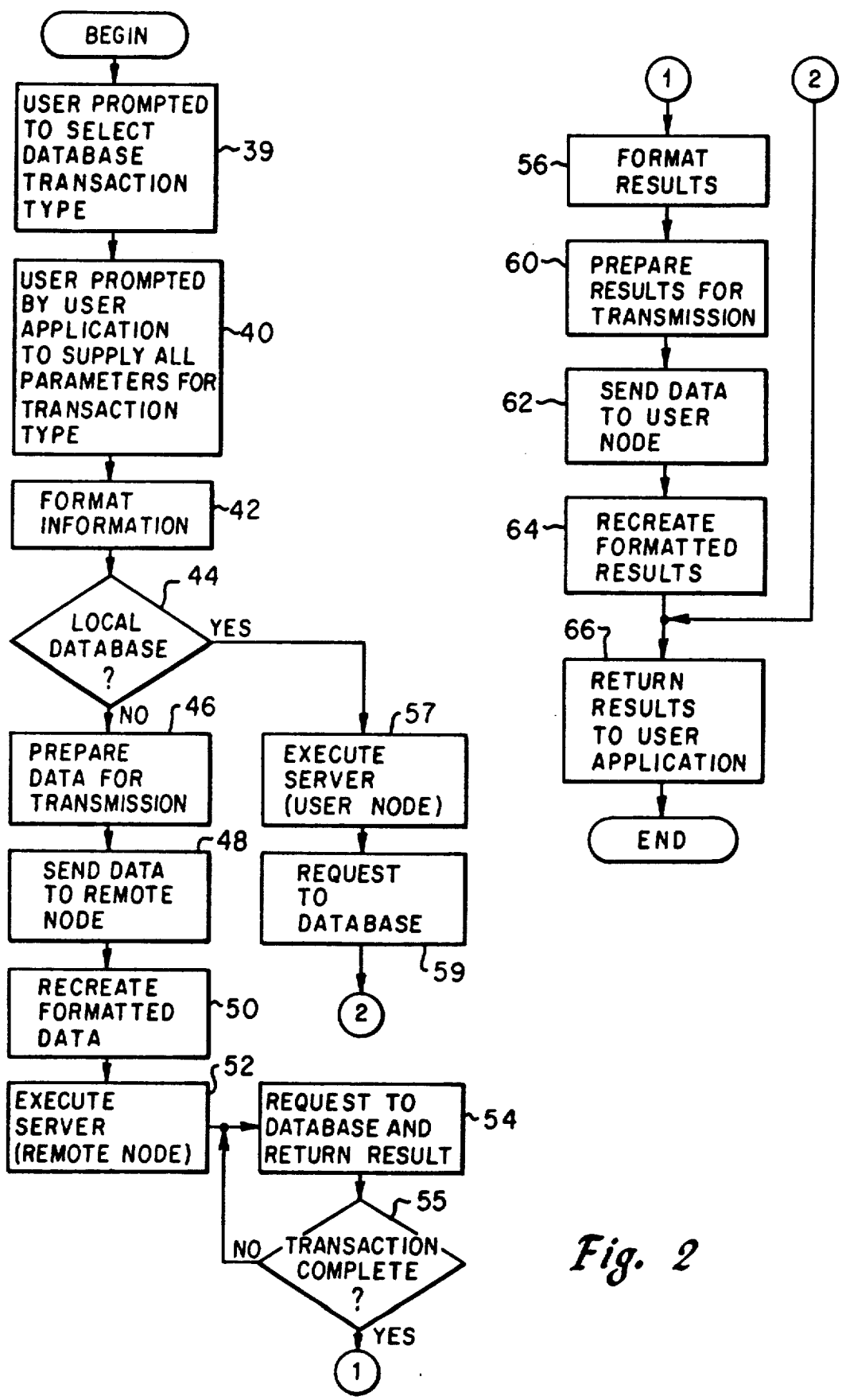
FIG. 2 is a flowchart of a method for making database accesses in accordance with the system of FIG. 1.

FIG. 2 is a flowchart illustrating the sequence of events which occur when a user at the local node undertakes to perform a transaction on the database. As described above, a transaction is a sequence of individual database requests, with any changes to the database being committed only when the transaction has been successfully completed. Thus, the sequence of database requests making up a single transaction can be considered as a whole, with all the elements thereof completing successfully, or failing, together. Any updates made to the database do not actually take effect until the transaction commits.

Referring to FIG. 2, when a user initiates a transaction, the interface portion of the user application gathers all of the required information from the user 40. The interface portion of the application may require the user to enter several items of information in response to individual queries, the user may be required to fill in blanks on a template, or other techniques known in the art may be used. Once all of the information necessary for the transaction has been gathered, it is formatted into a standard format 42 as will be described below. At this time, the interface portion 12 makes a procedure call to the remote data services utility 14 and passes the formatted information thereto.

The services utility 14 first determines whether the database against which the transaction is to run is a local or remote database 44. If the database is not local, the services utility 14 prepares the data for transmission over a network 46. This generally involves serializing what may be a complex data structure, including blocks of memory interconnected by pointers, into a "flat" structure representative of the same relationships. The data is then sent to the appropriate remote node 48 by the communications interfaces 18, 28, and the formatted data is recreated 50 at the remote node by the data services utility 30 at that node. The recreated data is preferably identical to the data formatted in step 42.

The remote data services utility 30 then causes the server portion of the user application 32 to execute 52, and passes the formatted data to it. The server portion of the user application now has all of the data necessary to execute the entire transaction. Until this time, the actual database requests which make up the transaction have not been considered by any part of the system. The code of the server portion 32 consists of a series of procedure calls 54 to the database manager 34, using the data gathered from the user as input. These procedure calls are database requests 54, and control passes back and forth between the server portion of the user application 32 and the database manager 34.

Once all of the database requests that make up a single transaction have been completed 55, the server portion 32 of the user application formats the results 56 and returns them to the services utility 30. The results are prepared for transmission 60 in the same manner as data was prepared for transmission in step 46. The data is then sent to the user node 62, and the formatted results are recreated 64 by the remote data services utility 14. The results are then returned to the user application 66, which performs local actions such as displaying the results to the user.

If the database to be accessed is a local database, the server portion 16 and database manager 20 are invoked 57 on the local node rather than invoking the server portion 32 and database manager 34 on a remote node. The flow of control in FIG. 2 determined by step 44 represents this situation. If the database is local to the user, the remote data services utility 14 invokes 57 the server portion 16 direct request 59, with no data preparation, transmission, or format recreation steps necessary. As far as the user interface 10 and interface portion 12 are concerned, the location of the server portion and database manager are not important; the information gathering and formatting steps 40, 42 are the same in either case.

For a particular application, a database manager is invoked by only a single server portion of the user application. The server portion can be called by a user application interface portion running locally, or by any number of such interface portions running on different network nodes. The only difference between users running database transactions from a local node or remote nodes is that the remote data services utility 14 on the remote nodes cause data to be transmitted over the network instead of passed directly to the server portion 16.

An example of the type of system which could advantageously be designed in accordance with the above principles would be a network of automated teller machines (ATM). A customer who wished to, for example, withdraw money from his account would initiate a transaction at an ATM by identifying himself with a magnetically coded card and a password. The card contains customer information such as bank identification and account number. The interface portion 12 requests the user to enter the amount of the transaction, and builds a data structure which generally includes at least the bank identification, account number, amount of transaction, and an identification of the ATM in use. This information is then transmitted to a central server holding the database. The server portion of the user application 32 then uses this transmitted information to make a series of calls to the database. Such a series of calls might include, for example, locking the required resources at the beginning of the transaction, updating the customer's account balance, updating the bank account balance, and updating the ATM account balance, and committing the transaction, and releasing the locked resources. A result is returned indicating whether the transaction is successful, and this information is transmitted back to the ATM. If the transaction is successful, the money is dispensed to the customer.

The example just described requires several calls to the database manager to perform various database functions. These include locking the necessary resources, performing the required updates, and committing the transaction. The program code to invoke these database requests is located in the server portion of the user application, so that the only information which need be transmitted over the network is the minimum amount of user information necessary for the transaction, and the results.

FIG. 2 illustrates the sequence of events utilized to perform a single transaction. Establishing a network communications link between the user node and the remote node is not shown. This link can be established once for a series of transactions, can be established permanently, or may be established anew for each transaction. The technique chosen will depend on the nature of the network and its topology.

The preferred embodiment can also incorporate the features of the previously cross-referenced related application titled REMOTE INTERRUPT PROCESSING, which is incorporated by reference. That application describes a technique for allowing the remote database manager to gracefully respond to an interrupt requested by the user. When a transaction is interrupted, preferably only the currently executing request is cancelled and rolled back, and the transaction remains pending. This means that all resource locks remain in place. The entire transaction is cancelled and rolled back only upon receipt of an explicit command to do so after the above described interrupt.

In order to rollback only the current request, a savepoint, as known in the art, is taken as each new request is begun, as well as at the beginning of the entire transaction. Such partial rollback saves the time already invested in the completed requests if the transaction is restarted; only the time invested in a single request is lost.

Figure 3:
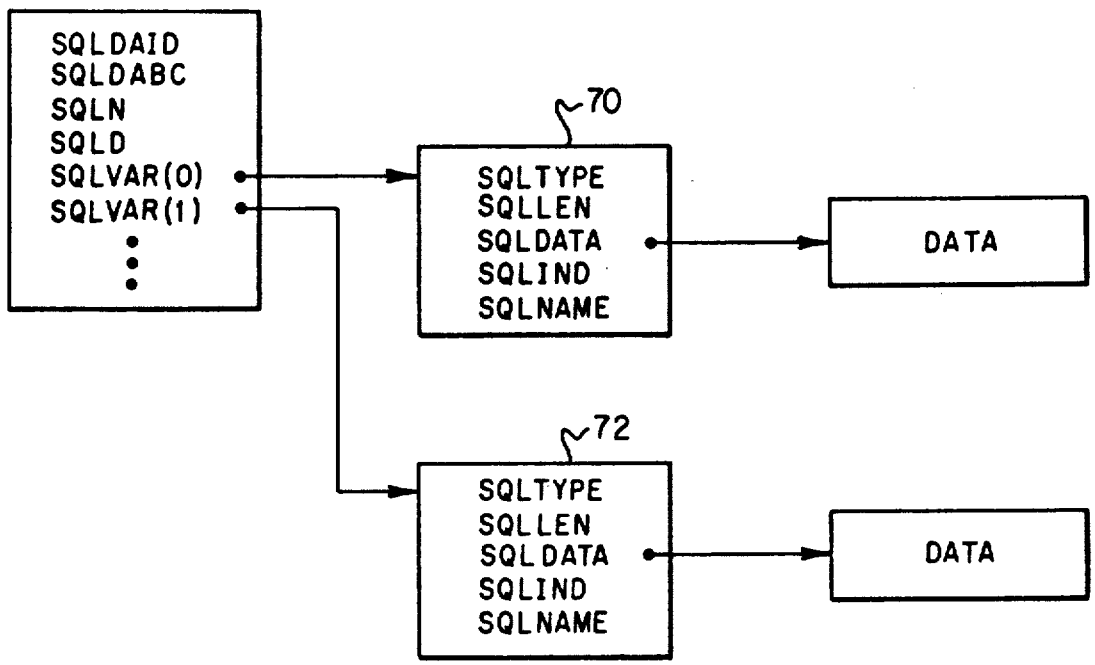
FIG. 3 illustrates data structures suitable for use with the method of FIG. 2.

FIG. 3 shows a data structure of the type created by the user application interface portion 12 and utilized by the server portion 32. FIG. 3 shows a structure for IN_SQLDA, which is an input data structure containing information needed for SQL database accesses. The variables shown in FIG. 3 are consistent with standard usage which will be recognized by those skilled in the art. The first two entries, SQLDAID and SQLDABC contain an identification string and total byte count for the structure. SQLN gives the number of variables which are included in the structure, and SQLD indicates how many of these are actually used. The entries SQLVAR[0] and SQLVAR[1] are pointers to data blocks containing information about variables. Each data block 70, 72 corresponds to 1 variable, and identifies that variable in a manner consistent with standard SQL usage. For example, the type and length of the variable are shown, and a pointer to the actual data itself is contained in each data block 70, 72.

Figure 4:
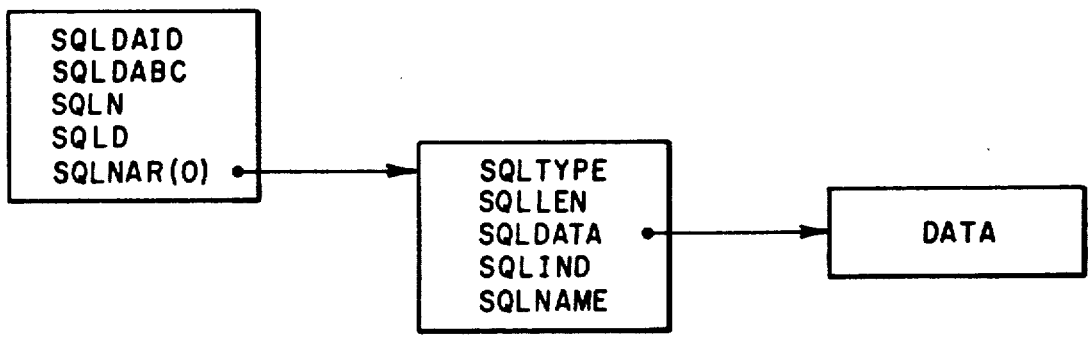
FIG. 4 illustrates data structures suitable for use with the method of FIG. 2.

FIG. 4 shows a data structure suitable for use for returning results as a variable OUT_SQLDA. This structure is analogous to that shown in FIG. 3. Both IN_SQLDA and OUT_SQLDA can contain different numbers of variables from those shown in FIGS. 3 and 4, depending upon the requirements of the particular application.

When the database is located on a node remote from the user, the data structure shown in FIGS. 3 and 4 must be "flattened" or "serialized" to a form suitable for transmission over a network. This serialization is performed by the remote data services routines 14, 30. The precise format used for the communication over a network will depend upon the type of network being used, but will generally be a simple serial string of characters. As long as all of the remote data services utilities know what communications format is being used, the precise nature of the transmission format is not important.

As will be recognized by those skilled in the art, the system and method described above minimize the amount of data which is transmitted over the network. The user application, which obtains data from the user and makes the necessary calls to the database, is divided into separate pieces in such a way as to allow for this minimum amount of communication. Obtaining user input, which can be time consuming given the relatively slow rate at which data is entered and the necessary validity checks which must be performed, is all accomplished at the local node without burdening the communications network. The process of performing database requests is all done at the server node at which the database is located. Use of the communications network is limited to identifying a transaction and passing precisely the information needed by that transaction, and returning a result.

While the invention has been particularly shown and described with reference to a preferred embodiment, it will be understood by those skilled in the art that various changes in form and detail may be made therein without departing from the spirit and scope of the invention.

We claim:

1. In a distributed data processing system including a local network node having a user interface facility and a remote node having a database manager for a remote database accessible through the remote node, a method for executing a transaction between the local network node and the remote database, comprising the steps executed by the distributed data processing system of:

prompting, through the user interface facility, user selection of a transaction type;

responsive to user selection of the transaction type, prompting user specification of values for a set of parameters associated with the transaction type needed for a series of requests defining the transaction;

transmitting from the local network node over a network communications link to the remote node, as a single message, the parameter values specified by the user;

responsive to receipt of the single message at the remote node, making a series of individual database request through the database manager using the transmitted parameter values to generate a transaction result; and returning the transaction result to the local network node as a second single message over a communications link.

2. The method of claim 1, wherein the step of making a series of individual database requests includes:

applying the set of parameter values to a remote application;

the series of database requests from the remote application using the set of parameter values.

3. The method of claim 2, wherein the set of parameter values and the transaction result are formatted in a preselected manner prior to transmission over the network communications link, and wherein the set of parameter values information and transaction result are stored upon receipt at the remote node and the local node, respectively.

4. The method of claim 1, wherein each of the individual database requests comprises an SQL request.

5. A distributed data processing system for executing transactions with a database, comprising:

a user node;
a remote node;
a network connecting the user node and the remote node;

interface facility means located on the user node for gathering information from a user, for constructing a series of related requests to the database and for displaying a result obtained from the database responsive to the series of related requests;

a database manager located on the remote node;

means for establishing a communications link between the user node and the remote node and for transmitting the series of requests in a single message;

server means located on the remote node responsive to receipt of the series of requests over the communications link for applying the related requests to the database and obtaining the result therefrom; and the establishing means further providing for establishing a communication link between the user node and the remote node for transmitting the result to the user node in a single message.

6. The system of claim 5, wherein said database manager is an SQL database manager, and each of the related requests is an SQL database request.

7. The system of claim 5, wherein the series of related requests define a transaction.

8. The system of claim 5, wherein said establishing means comprises:

remote and local network interfaces connected to the network and to the remote node and user node, respectively;

means for formatting the series of selected requests for transmission over the network and for recreating formatted results received from the remote node; and means for recreating formatted series of related requests received from the local node, and for formatting the result for transmission over the network.

9. The system of claim 8, further comprising:

a second database manager located on the local node; and means located on the local node for making the series of related requests to the second database manager;

wherein said local data services procedure communicates the series of related requests directly to said local node making means if the second database manager is requested by a user, and directs formatted series of related requests to the remote node if the remote node database manager is requested by the user.

* * * * *

UNITED STATES PATENT AND TRADEMARK OFFICE
CERTIFICATE OF CORRECTION

PATENT NO. : 5,179,660                                Page 1 of 2

DATED      : January 12, 1993

INVENTOR(S) : Estel P. Devany; Jane R. Garrison; Dwayne C. Garrison and Lloyd E. Jordan It is certified that error appears in the above-identified patent and that said Letters Patent is hereby corrected as shown below:

On the Title page, item [54] and col. 1, lines 4& 6,

In the Title: In the fourth line, after "IN" insert --PREDETERMINED--;

In the sixth line, after "RECEIVING" insert --SINGLE--;

Col. 1, in the Title, line 3, after "IN" insert --PREDETERMINED--;

line 6, before "TRANSMISSION" insert --SINGLE--;

Col. 7, line 24, after "single" insert --, unitary--;

line 24, after "values" insert --in a predetermined order specified for the transaction type--;

line 24, delete "specified by";

line 25, delete "the user";

line 26, after "single" insert --, unitary--;

line 28, delete "request" and substitute --requests--;

line 29, delete "parameter" and substitute --parameters--;

line 29, delete "values";

line 32, after "node" insert --in a predetermined order specified for the transaction type--;

line 32, after "single" insert --, unitary--;

Col. 8, line 5, after "database" insert --, for serializing the related requests in a predetermined order--;

line 8, after "manager" insert --and the database--;

line 11, after "single" insert --, unitary--;

line 12, after "sage" insert --and in the predetermined order--;

line 16, delete "and";

UNITED STATES PATENT AND TRADEMARK OFFICE
CERTIFICATE OF CORRECTION

PATENT NO.   :  5,179,660
DATED        :  January 12, 1993
INVENTOR(S)  :  Estel P. Devany; Jane R. Garrison; Dwayne C. Garrison and Lloyd E. Jordan It is certified that error appears in the above-identified patent and that said Letters Patent is hereby corrected as shown below:

Col. 8, line 16, after "database" insert --,--;

line 21, after "single" insert --,unitary--;

line 21, after "message" insert --and in a predetermined order--;

Signed and Sealed this

Twelfth Day of March, 1996

Attest:

BRUCE LEHMAN

*Attesting Officer*      *Commissioner of Patents and Trademarks*